Aug. 5, 1958 C. B. COLLINS 2,845,841
IMAGE REVERSING DEVICE
Filed March 3, 1955 3 Sheets-Sheet 1
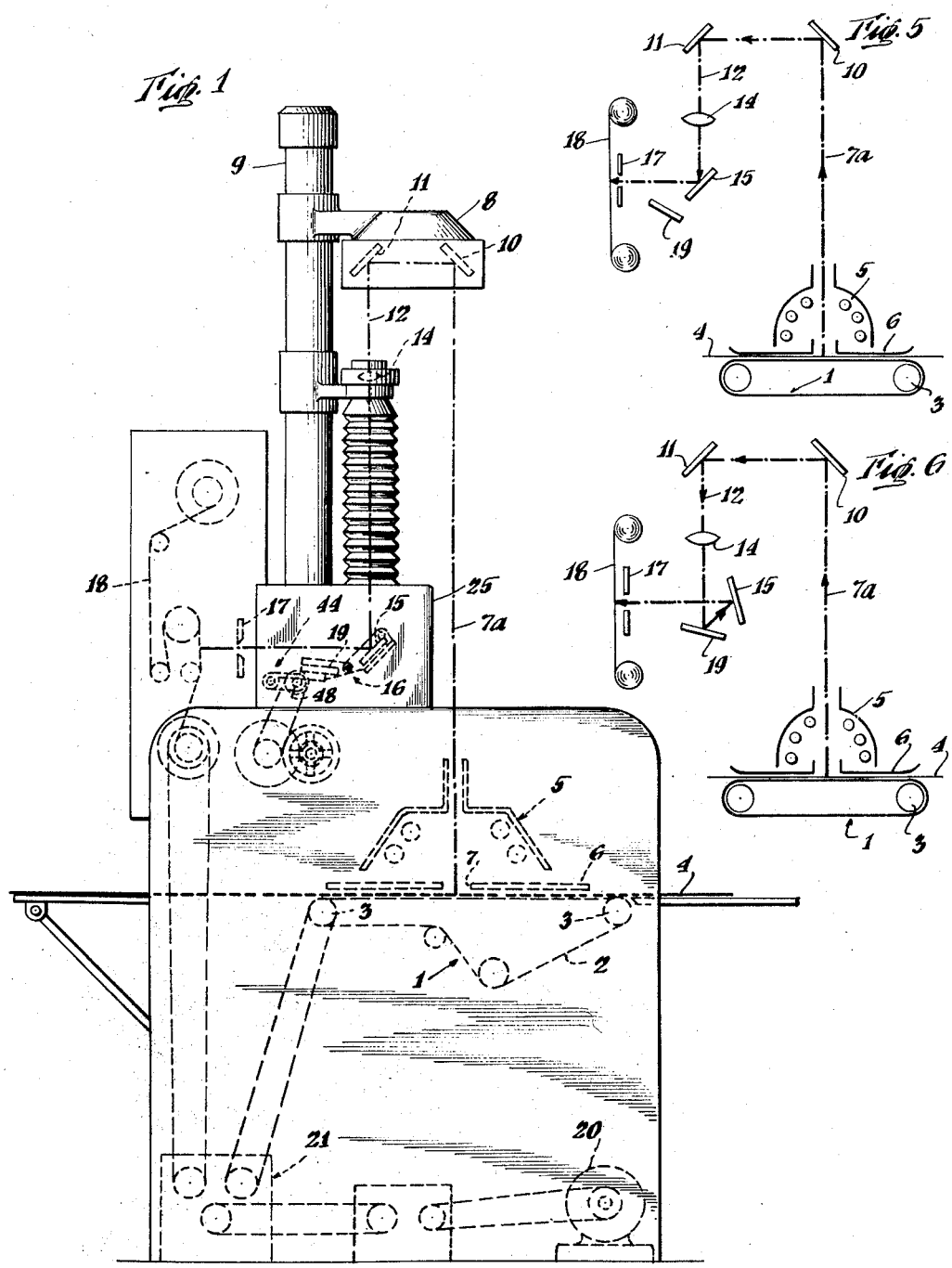
INVENTOR
Carroll B. Collins
BY
Norman Holland
ATTORNEY

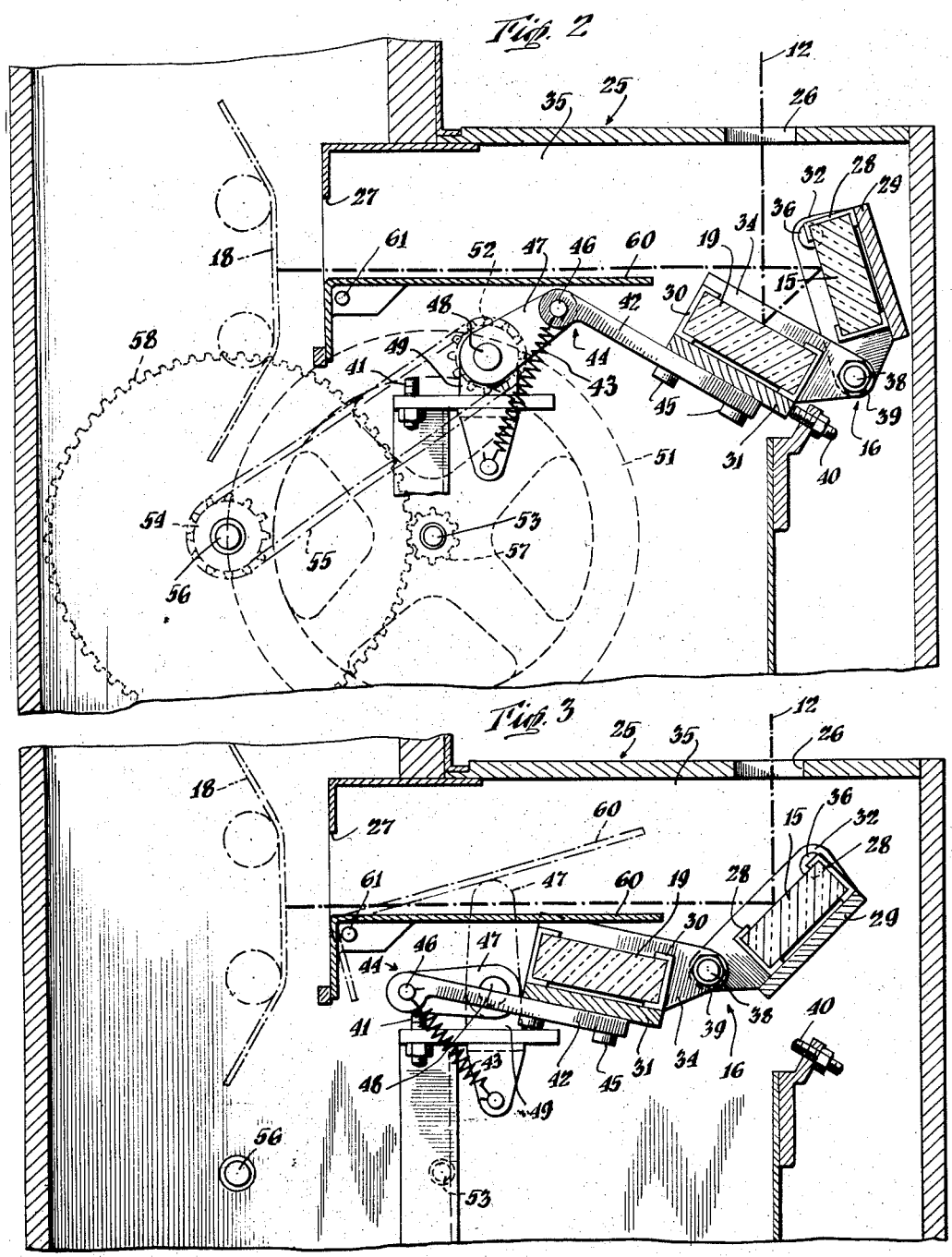

Aug. 5, 1958    C. B. COLLINS    2,845,841
IMAGE REVERSING DEVICE

Filed March 3, 1955    3 Sheets-Sheet 3

INVENTOR
Carroll B. Collins
BY
ATTORNEY

United States Patent Office 2,845,841
Patented Aug. 5, 1958

2,845,841

IMAGE REVERSING DEVICE

Carroll B. Collins, Pittsburgh, Pa., assignor to Peerless Photo Products, Inc., Shoreham, N. Y., a corporation of New York Application March 3, 1955, Serial No. 491,914

10 Claims. (Cl. 88—24)

The present invention relates to an optical device and, more particularly, to an image reversing device for a camera or projector which, at the turn of a control, will reverse the directed or reflected image from a right reading or normal image to a reversed image.

Although not limited to such use, the device is particularly useful in copying type cameras which are used to make both right reading and reverse copies. Reverse copies of originals are required in some duplicating processes while right reading copies are required in others.

An example of such a camera is a flow type copying camera which I have disclosed as a co-inventor in application No. 386,934, which has been partially assigned to the assignee of the present application. In copying cameras, the reversal of the image on the copying film is required for certain duplicating processes. Known methods of reversing the image use the substitution of a separate mirror system or lens system for the reversal, which requires the shifting of relatively large mounts and a duplication of parts. The present device requires only two mirrors and a relatively simple, rugged and easily adjusted mirror mounting arrangement. The mirror positions may be changed from right to reverse reading by the manipulation of a single, conveniently located control. Accordingly, an object of the present invention is to provide an improved optical image reversing device.

Another object of the present invention is to provide a simple, easily manipulated mirror type image reversing device.

Another object of the present invention is to provide an easily adjusted image reversing device.

Another object of the present invention is to provide an image reversing device adapted for remote control.

Another object of the present invention is to provide an image reversing device which is automatically locked into place.

Another object of the present invention is to provide a compact image reversing device.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view of an image reversing device according to the present invention shown installed on a flow type copying camera;

Fig. 2 is a sectional view of the image reversing device taken along the line 2—2 of Fig. 4;

Fig. 3 is a sectional view similar to Fig. 2 with the mirrors in their right reading position;

Fig. 5 is a schematic diagram of the image reversing device in its right reading position as used with the copying camera of Fig. 1; and Fig. 6 is a schematic diagram similar to Fig. 5 with the image reversing device in its reverse reading position.

Figure 4:
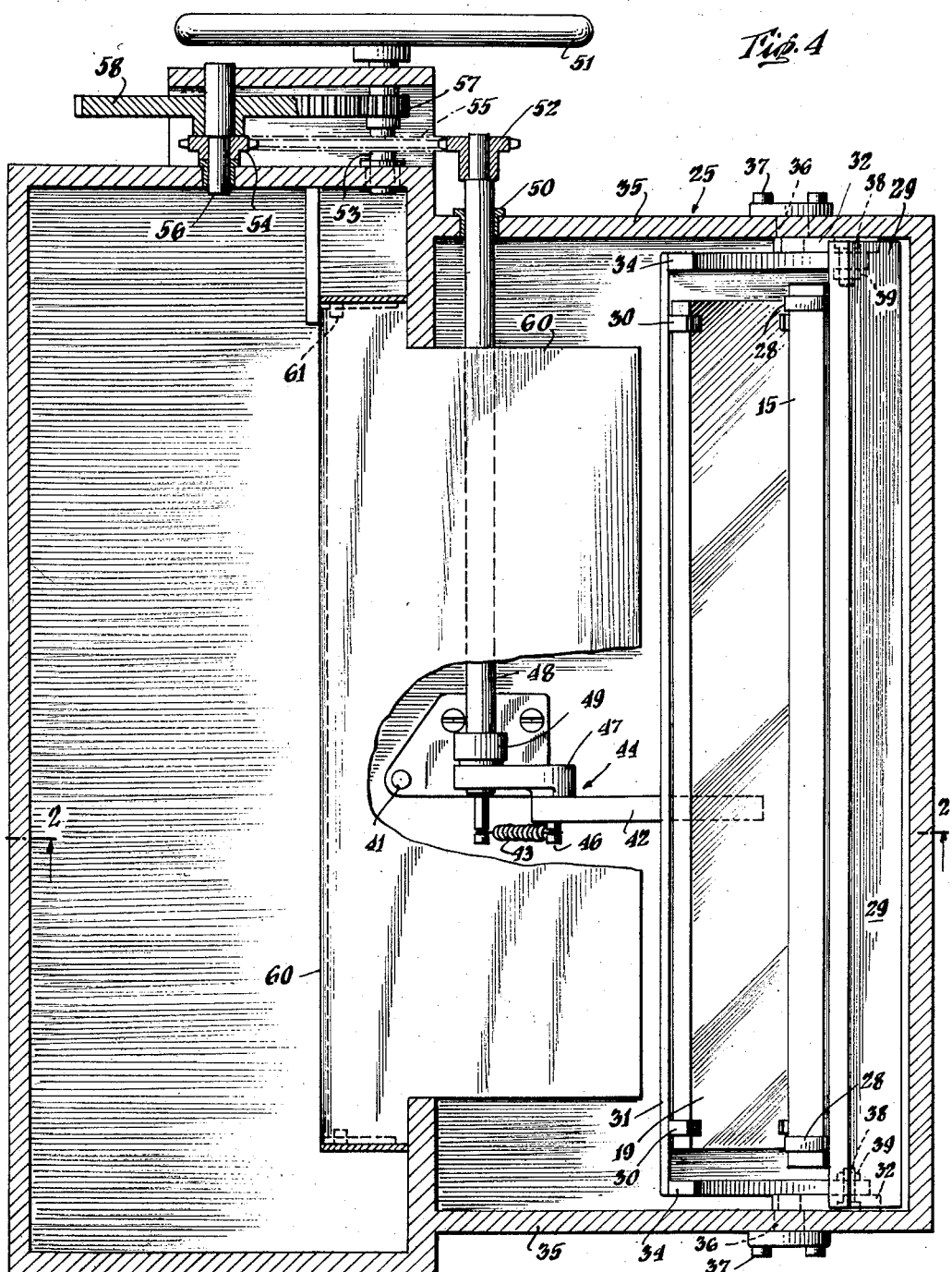
Fig. 4 is a plan view of the image reversing device with the surrounding cabinet partially cut away and with the mirrors in their reverse reading position.

The image reversing device will now be more fully described. The device will be described in connection with a flow type copying camera although it is to be understood that it may be employed in similar instruments in which a directed or reflected image is employed.

The flow type camera of Fig. 1 has a moving conveyor 1 comprising belt 2 mounted on a series of rollers 3 which carries an original 4 at a constant rate beneath a light source 5. An opaque platen 6 with a slot 7 is mounted above conveyor 1 so that an elongated strip of the original 4 is subjected to light from source 5. Light rays 7a from the illuminated strip of original 4 pass upwardly through light source 5 to a reflector system 8 slidably mounted on post 9. Reflector 8 reflects rays 7a by mirrors 10 and 11 downwardly as rays 12 through lens 14. Rays 12 are reflected by mirror 15 of the image reversing means 16 through aperture 17 onto moving photographic film 18 which records the image of the illuminated slit. Conveyor 1 and film 18 are suitably driven by a motor 20 through a variable speed reducer 21 and their relative speeds are synchronized in accordance with the degree of magnification desired. Focusing is done by axial movement of lens 14 and reflectors 8 on post 9.

A schematic diagram of the optical system for the camera is shown in Fig. 5. Here the image is transferred to film 18 in its right reading position as the image of the illuminated strip of original 4 has been reversed an even number of times. Thus, it has been reversed four times, one time each by mirrors 10, 11 and 15 and lens 14.

When a reversed image is required on recording film 18, an additional reversal of the image is required. The added reversal is performed by the positioning of an additional mirror 19 in the optical system as is shown in Fig. 6. The image is now reversed an odd number of times.

The additional mirror 19 is positioned in the optical system by the image reversing device which will now be more fully described with particular reference to Figs. 2, 3 and 4.

The image reversing means 16 is mounted in a suitable boxlike enclosure 25 which rays 12 enter and leave through suitable slits 26 and 27 in the top and side, respectively. As was explained in connection with Figs. 5 and 6, a single mirror 15 is used to reflect ray 12 against film 18 in a right reading sense and two mirrors 15 and 19 are used when an additional reversal is required to reflect rays 12 against film 18 in a reverse reading sense.

Mirrors 15 and 19 are mounted so that in one position mirror 15 is correctly positioned to reflect rays 12 to the proper point on film 18 and in another position both mirrors 15 and 19 are positioned with respect to each other and to film 18 so that rays 12 are reflected from mirror 19 to mirror 15 and thence to film 18.

Mirror 15 is mounted by spring clips 28 on an elongated flat plate 29 and mirror 19 is mounted by clips 30 on a generally similar plate 31. Plates 29 and 31 have trunnion plates 32 and 34 respectively at both ends of each to rotatably mount them with respect to enclosure 25. The upper ends of trunnion plates 32 are pivotally connected to the sides 35 of closure 25 by pivots 36. Pivots 36 are fixed to sides 35 by suitable fastening such as by bolts 37. The lower end of trunnion plate 32 is pivotally connected to trunnion plate 34 by a pin 38. Pin 38 is held in place on trunnion plate 34 by bolt or other locking means 39.

The position of mirror 19 on plate 31 and, thus also, of pivotally connected mirror 15 on plate 29, is determined by a remotely controlled linkage 44 and cooperating stops 40 and 41. The linkage 44 comprises a connecting link 42 fastened at one end directly to plate 31 by bolts 45 and a crank 47 pivotally connected to the other end of link 42 by a pin 46.

Crank 47 is fixedly attached to a rotatable shaft 48 so that it may be rotated thereby to move the connecting link 42 from a position against stop 41 as is seen in Fig. 3 to a position in which plate 31 abuts stop 40 as is seen in Fig. 2.

Shaft 48 is mounted by a bearing 49 fixedly mounted within enclosure 25 and another bearing 50 conveniently positioned in side 35 of enclosure 25. A suitable drive system operatively connects shaft 48 with a control wheel 51 conveniently located near the other camera operating controls on a shaft 53. The drive system preferably comprises sprocket 52 on shaft 48 which is connected to sprocket 54 on shaft 56 by a chain 55 and which is driven by control wheel 51 through the intermediation of speed reduction gears 57 and 58. Small gear 57 on shaft 53 engages larger gear 58 on shaft 56 to provide a speed reduction between shaft 48 and control wheel 51 so that the control wheel 51 moves the mirrors from one position to the other in a smooth and easily controlled manner.

A cover plate 60, pivotally attached by pins 61 to enclosure 25, is mounted above mirror 19 so that it covers it and prevents reflections from its surface when only mirror 15 is in use. When the mirrors are shifted from one position to the other, crank 47 contacts the cover plate 60 and swings it clear of mirror 19.

In shifting from a right reading to a reverse reading image on film 18, it is desirable to keep the rays striking film 18 perpendicular thereto. The position of the mirror 15 is determined by the proportioning of the various members so that when the device is in the right reading position of Fig. 3, the ray 12 is reflected in a perpendicular direction with respect to film 18. Adjustable stop 41 is used to make minor adjustments in the position of mirror 15 for the right reading position. Mirror 19 need only be located in this position so that it is clear of the rays reflected from mirror 15 toward film 18. Adjustable stop 40 is located and adjusted to set the proper position of mirror 15 when the device is in the reverse reading position of Fig. 2. Mirror 19 is mounted on plate 31 so that it is correctly positioned with respect to mirror 15 and rays 12 when the device is in the reverse reading position to reflect rays 12 from itself and mirror 15 toward film 18 at right angles thereto.

It is thus clear that the construction of the device permits the rays to be reflected perpendicularly onto film 18 for both the right reading and the reverse reading positions and also allows minor adjustments in the ray direction to be made by the adjustable stops in either position without affecting the other position. Thus, for example, stop 41 may be adjusted for the right reading position without affecting the setting of the mirrors for the reverse reading position and stop 40 may be adjusted for the reverse reading position without affecting the setting of the right reading position.

The terms "right reading" and "reverse reading" are used in the above description to indicate the orientation of the image on film 18 of the camera shown in Fig. 1. This results from the fact that when mirror 15 only is used, the image is reversed an even number of times over all and thus appears at film 18 in its right reading sense. If an additional lens or mirror is used in the path between the original and the film, it is clear that the positions of the image reversing device will be reversed so that the position shown in Fig. 3 then is the reverse reading position.

Once the image reversing device has been turned to one position or the other, it is desirable that it automatically lock in position. With the device described this is accomplished by the turning moments on shaft 48 of the weights of the linkage 44, the mirrors 15 and 19, and plates 29 and 31. If necessary or desirable, additional weights may be added to the reversing device to increase the turning moment or a suitable spring such as spring 43 may be connected between the crank 47 and the enclosure 25 to resiliently hold the reversing device in position against the stops.

It will be seen that the present invention provides a new and novel image reversing device for optical instruments using directed, projected or reflected images or for similar instruments. A relatively simple image reversing device is provided which is quickly and easily manipulated. The device is especially well adapted for remote control through simple drive connections. Adjustments are provided which independently correct the orientation of the reversing means in its right reading and reverse reading positions.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a copying camera in which an original is projected onto a copy medium, an image reversing means comprising a first mirror, a second mirror, said first mirror pivotally mounted on the camera to swing about one edge and pivotally attached to said second mirror along an opposite edge, a positioning means for said mirrors comprising a link, a crank pivotally connected to one end of said link, said link having its other end fixedly attached to said second mirror, said crank adapted for rotation from a first position to a second position to move said mirrors by means of said link between a first position in which said light rays from the original are reflected only from said first mirror to a second position in which the light rays from the original are reflected from both mirrors successively.

2. The image reversing means as claimed in claim 1 in which a retaining means tends to hold said mirrors in position.

3. The image reversing means as claimed in claim 2 in which said retaining means comprises a portion of the weight of the reversing means.

4. The image reversing means as claimed in claim 2 in which said retaining means comprises a resilient member.

5. In a flow type copying camera in which an image of an illuminated slitlike portion of an original is transmitted onto a copying medium, an image reversing means comprising first and second elongated mirrors, a first elongated plate mounting one of said mirrors pivotally fastened on said camera to rotate about one of its longer edges, a second elongated plate mounting the second of said mirrors and pivotally attached at one of its longer edges to the long edge of said first plate opposite the pivotally attached edge, a positioning means for said plates adapted to move them from a first position set by a first stop to a second position set by a second stop and said plates arranged in one of said positions to place only one of said mirrors to reflect the transmitted image and arranged in the other position to place both of said mirrors to reflect successively said transmitted image.

6. The camera as claimed in claim 5 in which a retaining means tends to hold said image reversing means in position against the stops.

7. The camera as claimed in claim 5 in which said positioning means comprises a link member attached at one end to one of said elongated plates, a crank pivotally attached at one end to said link, a shaft coupled to said crank to rotate it from a first position to a second position to move said mirrors by means of said link and said plates between their said first and second positions, and a remotely connected drive for said shaft.

8. The camera as claimed in claim 7 in which said remotely connected drive is coupled to said shaft through a speed reduction means.

9. The camera as claimed in claim 5 in which said plates are positioned by one of said stops in one of said positions to place only one of said mirrors to reflect the image through a predetermined angle in a reversed sense and said plates are positioned by the other of said stops in the other of said positions to successively reflect the image at said predetermined angle in a right reading sense.

10. In a copying camera in which an original is projected onto a copy medium an image reversing means comprising a first mirror, a second mirror, said first mirror pivotally mounted on the camera to swing about one edge and pivotally attached to said second mirror along an opposite edge, a positioning means for said mirrors pivotally connected to said second mirror and adapted to move it and the pivotally connected first mirror from a first position in which the light rays from the original are reflected only from one of said mirrors to a second position in which the light rays from the original are reflected from both of said mirrors successively, stop means at said first and second positions to determine the position of said mirrors, and said stop means positioned whereby the reflected image rays form the same angle with the incident image rays for both of said mirror positions.

References Cited in the file of this patent

UNITED STATES PATENTS

| | | |
|---|---|---|
| 2,332,810 | Place | Oct. 26, 1943 |
| 2,517,414 | Pratt | Aug. 1, 1950 |
| 2,589,363 | Foufounis | Mar. 18, 1952 |